US009009900B2

(12) United States Patent
Loftis et al.

(10) Patent No.: US 9,009,900 B2
(45) Date of Patent: Apr. 21, 2015

(54) SYSTEM AND METHOD FOR ALIGNING PORTIONS OF A LOADING RAMP

(71) Applicant: Progress Rail Services Corporation, Albertville, AL (US)

(72) Inventors: Anthony Lee Loftis, Pike Road, AL (US); Curtis Taylor Davis, Millbrook, AL (US)

(73) Assignee: Progress Rail Services Corporation, Albertville, AL (US)

( * ) Notice: Subject to any disclaimer, the term of this patent is extended or adjusted under 35 U.S.C. 154(b) by 0 days.

(21) Appl. No.: 14/459,450

(22) Filed: Aug. 14, 2014

(65) Prior Publication Data

US 2014/0345067 A1    Nov. 27, 2014

Related U.S. Application Data

(62) Division of application No. 13/598,025, filed on Aug. 29, 2012, now Pat. No. 8,832,890.

(51) Int. Cl.
*E01D 15/12* (2006.01)
*B61D 47/00* (2006.01)
*B65G 69/30* (2006.01)

(52) U.S. Cl.
CPC ............... *B61D 47/00* (2013.01); *B65G 69/30* (2013.01)

(58) Field of Classification Search
USPC .................. 14/2.4, 69.5, 71.3, 71.5; 105/449; 414/537
IPC ..................... E01D 15/00,15/10, 15/12, 15/127
See application file for complete search history.

(56) References Cited

U.S. PATENT DOCUMENTS

| 2,429,010 | A |   | 10/1947 | Woolslayer et al. |
|-----------|---|---|---------|-------------------|
| 2,687,617 | A | * | 8/1954  | Newell ........................ 405/221 |
| 2,695,716 | A | * | 11/1954 | Graham ....................... 414/229 |
| 2,815,872 | A | * | 12/1957 | Graham ....................... 414/229 |
| 3,538,528 | A |   | 11/1970 | Porter et al. |
| 3,846,860 | A |   | 11/1974 | Kummerman |
| 3,879,784 | A |   | 4/1975  | Kummerman |
| 4,119,224 | A |   | 10/1978 | Moody |
| 4,807,317 | A | * | 2/1989  | Quinn et al. ................... 14/69.5 |
| 5,161,104 | A |   | 11/1992 | Fox et al. |
| 5,443,353 | A |   | 8/1995  | Raymer |
| 5,697,754 | A |   | 12/1997 | Raymer |
| 5,733,091 | A |   | 3/1998  | Long |
| 5,749,615 | A | * | 5/1998  | Itson .......................... 296/26.03 |

(Continued)

FOREIGN PATENT DOCUMENTS

| CH | 672 302         |   | 11/1989 |
|----|-----------------|---|---------|
| WO | WO 93/17199     | * | 9/1993  |
| WO | WO 02/064407 A1 |   | 8/2002  |

*Primary Examiner* — Gary Hartmann
(74) *Attorney, Agent, or Firm* — Finnegan, Henderson, Farabow, Garrett & Dunner, LLP

(57) ABSTRACT

A system for aligning outer edges of upper surfaces of ramp portions of a loading ramp. The system may include a plurality of sensors configured to provide signals indicative of whether the outer edges of upper surfaces of adjacent ramp portions are aligned. The system may also include a plurality of actuators configured to raise and lower at least one of the outer edges of an upper surface of a ramp portion. The system may also include a controller configured to receive signals from the plurality of sensors, determine whether the outer edges of upper surfaces of adjacent ramp portions are aligned, and provide signals to the actuators to affect movement thereof causing the outer edges of the upper surfaces of the adjacent ramp portions to be aligned.

5 Claims, 5 Drawing Sheets

(56) References Cited

U.S. PATENT DOCUMENTS

| | | |
|---|---|---|
| 5,829,947 A | 11/1998 | Litten |
| 6,647,898 B2 | 11/2003 | Li |
| 6,954,959 B2 | 10/2005 | Hutton |
| 7,428,765 B2 * | 9/2008 | Hutton .................. 14/71.5 |
| 7,603,734 B2 * | 10/2009 | Connelly et al. ............ 14/71.3 |
| 7,690,878 B2 | 4/2010 | Aaron |
| 8,061,933 B2 | 11/2011 | Alloggio et al. |
| 8,448,278 B1 * | 5/2013 | Beilstein .................. 14/69.5 |
| 8,695,140 B1 * | 4/2014 | Zyadet ..................... 14/69.5 |
| 2002/0029720 A1 | 3/2002 | Esposito et al. |
| 2004/0250360 A1 * | 12/2004 | Young et al. ............... 14/69.5 |
| 2006/0081420 A1 * | 4/2006 | Ford et al. ................. 187/224 |
| 2010/0031454 A1 | 2/2010 | Deschamps |
| 2013/0319796 A1 | 12/2013 | Davis |
| 2014/0059786 A1 * | 3/2014 | Loftis et al. ............... 14/69.5 |

* cited by examiner

SYSTEM AND METHOD FOR ALIGNING PORTIONS OF A LOADING RAMP

CROSS REFERENCE TO RELATED APPLICATION

This patent application is a divisional of copending U.S. patent application Ser. No. 13/598,025 filed Aug. 29, 2012.

TECHNICAL FIELD

This disclosure relates generally to loading ramps and, more specifically, to systems and methods for aligning portions of a loading ramp.

BACKGROUND

Portable ramps are used for loading railway maintenance equipment and other heavy machinery onto flat railcars that are to be transported to other service locations. These portable ramps may have multiple segments connected to one another with hinges to allow the segments to be folded for ease of transportation and storage of the ramp.

When the ramps are deployed, heavy machinery can be driven or pulled up the ramp onto the flat railcar. Because of differences in the height of different parts of the rails on which the railcar rides, hinged ramps may sag in some areas, especially when the ramp is exposed to the heavy weight of machinery as it is loaded onto the railcar. This sagging causes the ramp to be uneven at the joints of the segments of the ramp.

One solution for supporting ramps at their hinges is described in U.S. Pat. No. 5,697,754 (the '754 patent). The '754 patent discloses a hinged ramp assembly for use with a flat railcar. To deploy and retract the ramp, a number of mechanical deployment and retraction facilitating elements are mounted to the ramp sections and operatively connected to a plurality of actuators. The '754 patent discloses legs connected to the ramp close to the hinged joints to provide additional support for sections of the ramp that are significantly higher than the surface of the rails.

The solution provided by the '754 patent is subject to a number of possible drawbacks. First, the stability of the assembly ramp in the '754 patent depends upon the ramp being deployed on a level surface. The '754 patent does not disclose any way to level the ramp when employed on uneven surfaces. For ramps deployed on rails, uneven rails can significantly affect the stability of the ramp, making uneven parts susceptible to sagging. Furthermore, the '754 patent only discloses using legs to support the hinges of those ramp sections closest to the railcar. It may be desirable to support the lower sections of the ramp, even where the ramp itself may be in contact with at least a part of one of the rails.

The presently disclosed system and method is directed to mitigating or overcoming one or more of the possible drawbacks set forth above and/or other problems in the art.

SUMMARY

According to one aspect, this disclosure is directed to a system for aligning outer edges of upper surfaces of ramp portions of a loading ramp. The system may include a plurality of sensors configured to provide signals indicative of whether the outer edges of upper surfaces of adjacent ramp portions are aligned. The system may also include a plurality of actuators configured to raise and lower at least one of the outer edges of an upper surface of a ramp portion. The system may also include a controller configured to receive signals from the plurality of sensors, determine whether the outer edges of upper surfaces of adjacent ramp portions are aligned, and provide signals to the actuators to affect movement thereof causing the outer edges of the upper surfaces of the adjacent ramp portions to be aligned.

In accordance with another aspect, this disclosure is directed to a method of leveling a ramp having a first portion and a second portion. The method may include determining that outer edges of the first ramp portion are not aligned with the outer edges of the second ramp portion. The method may also include determining a desired effective length of at least one leveling jack associated with the first ramp portion based on the determination. The method may also include operating an actuator associated with the at least one leveling jack to achieve the desired effective length of the at least one leveling jack.

According to another aspect, this disclosure is directed to a ramp including a plurality of ramp portions, each having a first end, a second end, and a top surface for supporting objects movable over the ramp sections. The ramp may also include a plurality of joints, each connecting the first end of one of the plurality of ramp portions to the second end of another of the plurality of ramp portions. The ramp may also include a leveling system. The system may include a plurality of sensors configured to provide signals indicative of whether the outer edges of upper surfaces of adjacent ramp portions are aligned. The system may also include a plurality of actuators configured to raise and lower at least one of the outer edges of an upper surface of a ramp portion. The system may also include a controller configured to receive signals from the plurality of sensors, determine whether the outer edges of upper surfaces of adjacent ramp portions are aligned, and provide signals to the actuators to effect movement thereof causing at least one of the outer edges of the upper surface of at least one ramp portion to move such that the outer edges of the upper surfaces of the ramp portions are aligned.

DETAILED DESCRIPTION

Figure 1:
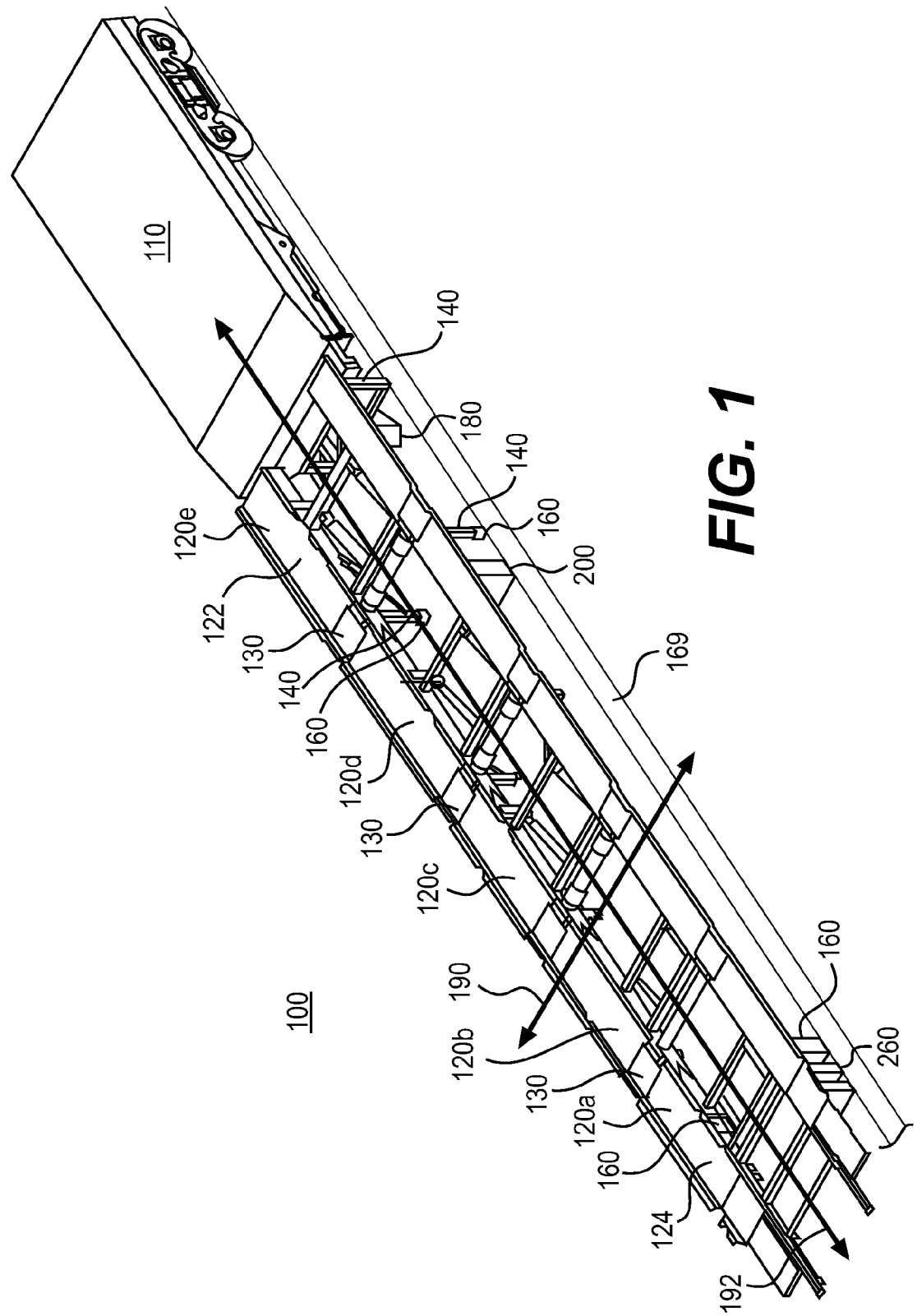
FIG. 1 is a perspective view of an exemplary ramp associated with an exemplary railcar.

FIG. 1 shows an exemplary ramp 100 on which systems and methods for ramp leveling may be implemented consistent with the disclosed embodiments. Exemplary ramp 100 may be any ramp configured for moving objects from one level to another level. According to some embodiments, ramp 100 may be configured to load work equipment onto a flat railcar 110. Exemplary ramp 100 may be configured to load both rail-bound and rubber-tired machines. Ramp 100 may include a plurality of ramp portions 120, including a top ramp portion 122, a bottom ramp portion 124, and one or more additional ramp portions 120 between top ramp portion 122 and bottom ramp portion 124. For example, FIG. 1 shows ramp 100 with five ramp portions 120a-e. Each ramp portion 120 may have a top surface over which the objects may be moved between two levels. Top ramp portion 122 is the highest portion of ramp 100 when ramp 100 is extended. For example, the ramp portion 120 that connects or comes in contact with railcar 110 may be top ramp portion 122. Bottom ramp portion 124 is the lowest portion of ramp 100 when ramp 100 is extended. For example, ramp portion 120 that connects or comes in contact with the ground surface is bottom ramp portion 124. According to some embodiments, objects traveling up ramp 100 pass over bottom ramp portion 124 before passing over top ramp portion 122.

Figure 2:
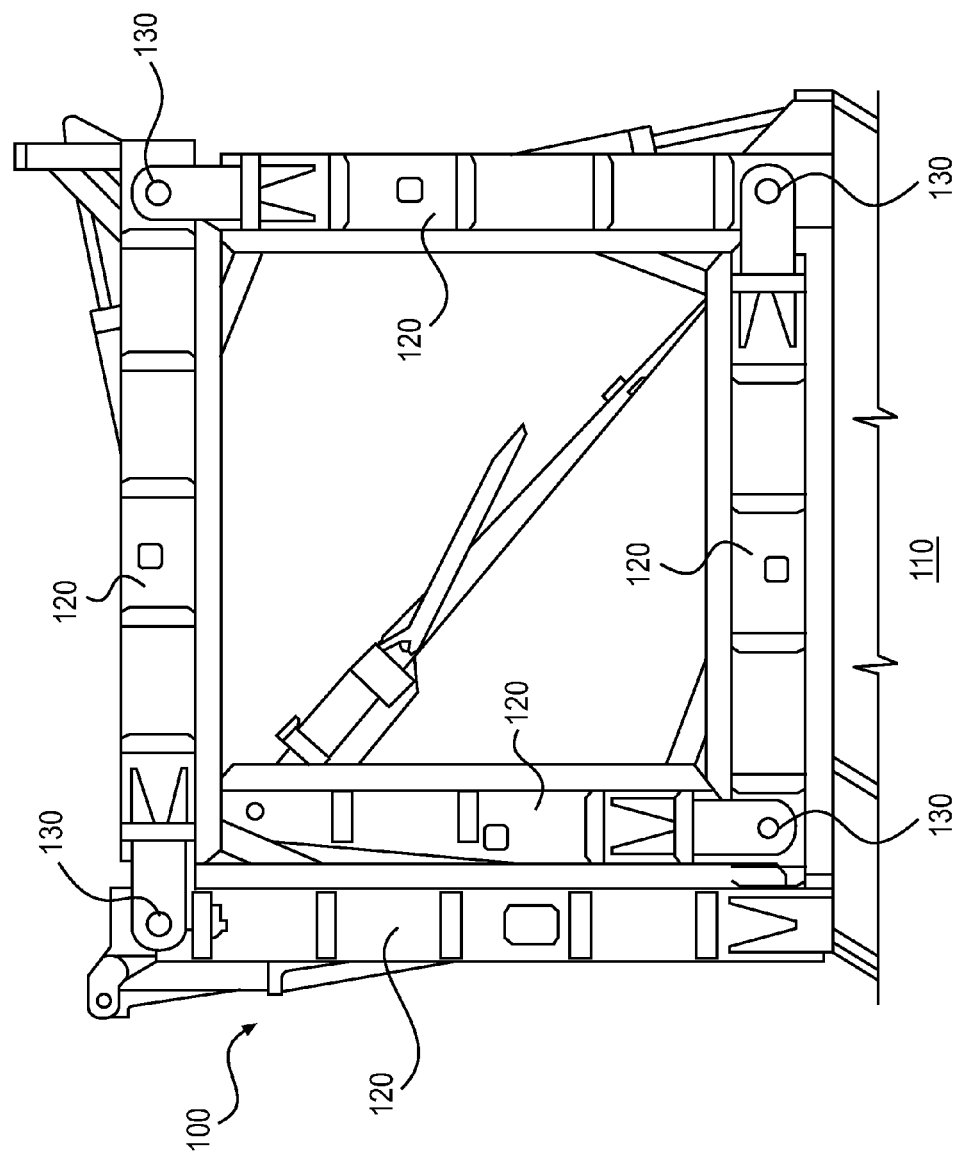
FIG. 2 is a side view of an exemplary embodiment of a ramp retracted and stored on an exemplary railcar.

As shown in FIG. 2, ramp portions 120 may be pivotally connected to one another with joints 130. The first end of one ramp portion 120 may be connected to the second end of another ramp portion 120 by joint 130. Joints 130 may comprise any hinge or pivoting device that enables ramp portions 120 to connect to form a top ramp surface over which objects may be moved. As shown in FIG. 2, joints 130 may optionally enable ramp 100 to be retracted.

Ramp 100 may also include a plurality of legs 140 to provide support for one or more of ramp portions 120. According to some embodiments, legs 140 may be pivotally connected to ramp 100. Legs 140 may each be connected to the bottom surface of one of the ramp portions 120. Legs 140 may be located at either edge of ramp 100, to provide support at the edges of ramp 100. Additionally or alternatively, ramp 100 may include one or more legs 140 at the center of ramp 100 with respect to the ramp width. According to some embodiments, legs 140 may be located at or near joints 130. For example, ramp 100 may include a pair of legs 140 at each joint 130, the legs 140 positioned at the outer edges of ramp 100. Alternatively, ramp 100 may include a pair of legs 140 at some of joints 130, such as, for example, joints 130 that are at the higher end of ramp 100.

Figure 3:
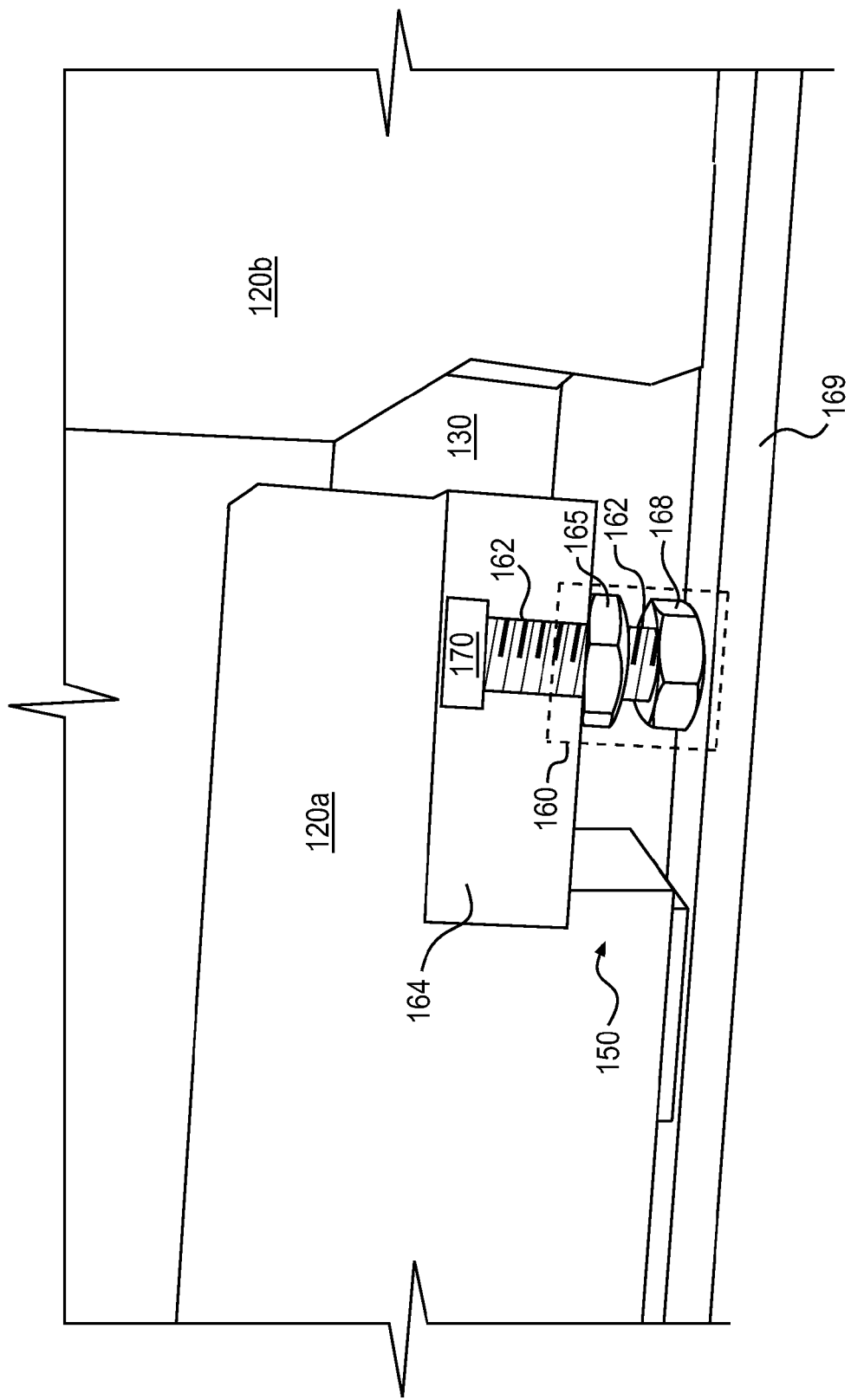
FIG. 3 is a side view of a leveling jack and actuator associated with an exemplary ramp.

As shown in FIG. 3, ramp 100 may also include a leveling system 150 configured for leveling one or more ramp portions 120. Optionally, leveling system 150 may be configured for leveling the entire ramp 100. Leveling system 150 may include components for adjusting the slope of ramp 100 and/or ramp portions 120 and components for determining the longitudinal slope of ramp 100 and/or ramp portions 120.

According to some embodiments, leveling system 150 may include one or more leveling jacks 160 configured to raise, lower, and/or adjust the longitudinal or lateral level of ramp portions 120. Leveling jack 160 may be designed to meet the particular needs of ramp 100, such as, for example, maximum load weight. Leveling jack 160 may also be customized based on its relative location on ramp 100. Its design may be capable of supporting ramp 100 while ramp 100 is being used to move objects and further be capable of adjusting the height of different sections of ramp portions 120.

FIG. 3 shows a side view of an exemplary leveling jack 160 coupled to a ramp portion 120. Leveling jack 160 may include a shaft 162 received in a mounting device 164. According to some embodiments, shaft 162 may include a threaded shaft. In this example, the amount of extension of shaft 162 from mounting device 164 may be adjusted by rotating shaft 162 such that the amount of extension of shaft 162 increases or decreases. For example, if shaft 162 is rotated in a manner to reduce its extension from mounting device 164, that length of shaft 162 may be threaded deeper into mounting device 164 and/or ramp portion 120. Mounting device 164 shown in FIG. 3 includes a nut 165 through which shaft 162 is threaded.

Leveling jack 160 may also include a foot 168 attached to a lower end of shaft 162 adapted to support leveling jack 160 on a surface. Foot 168 may be specifically adapted based on the type of surface on which ramp 100 is designed to operate. For example, ramp 100 in FIG. 3 is used on railroad tracks, and foot 168 has a size and/or shape to stand on a top surface of one of the rails 169 of a railroad track. For example, foot 168 may include a nut secured to the second end of threaded vertical shaft 162. Additionally or alternatively, shaft 162 may be a portion of a bolt, and the bolt head may be foot 168. In alternative embodiments, foot 168 may have a molded size and/or shape that is specially designed to partially wrap around rail 169 to provide stability.

Leveling system 150 may also include an actuator 170 for adjusting the effective length of leveling jack 160. According to some embodiments, leveling jack 160 may include a linear actuator 170 configured to extend or retract to adjust the effective length of leveling jack 160. According to some embodiments, actuator 170 may be any device capable of linearly adjusting the effective length of leveling jack 160, such as, for example, an electric motor, a hydraulic motor, or a pneumatic motor. According to some embodiments, actuator 170 may be capable of adjusting the effective length of leveling jack 160 while ramp 100 is deployed. For example, actuator 170 may be capable of supplying enough torque to overcome, at least, the friction force exerted on leveling jack 160 by the weight of ramp 100.

According to some embodiments, actuator 170 may also be capable of adjusting the effective length of leveling jack 160 in response to a signal received by actuator 170. For example, actuator 170 may receive a signal for actuating operation of actuator 170 to achieve a desired effective length of leveling jack 160, and, based on the signal, actuator 170 may adjust the effective length of leveling jack 160. According to some embodiments, actuator 170 may be capable of sending a signal indicative of the effective length of leveling jack 160 and/or a change in effective length of leveling jack 160 resulting from adjustments made by actuator 170. For example, actuator 170 may send a signal indicative of the effective length of leveling jack 160 in response to a request from another system.

Leveling system 150 may include a plurality of leveling jacks 160 and a plurality of actuators 170 to adjust respective leveling jacks 160. For example, ramp 100 shown in FIG. 1 includes two pairs of leveling jacks 160 with the pairs of leveling jacks 160 being spaced longitudinally from one another relative to ramp 100 and with each one of the pairs of leveling jacks 160 being located at opposite edges of ramp 100. According to some embodiments, ramp 100 may include a leveling jack 160 associated with leg 140, such that leveling jack 160 may be configured to adjust the length of leg 140. For example, leveling jack 160 may be mounted between ramp 100 and leg 140, so that the upper end of leg 140 is attached to the foot of leveling jack 160. According to some embodiments, the second end of one of legs 140 is attached to one of leveling jacks 160, which is configured to adjust the effective length of leg 140.

Leveling system 150 may also include a controller 180 (see FIG. 1) configured to control the operation of one or more of leveling jacks 160. According to some embodiments, controller 180 may send signals to one or more of actuators 170 indicative of an adjustment to an associated leveling jack 160. Controller 180 may embody a single microprocessor or multiple microprocessors that include a means for controlling the operation of actuators 170 and for receiving signals, such as, for example, from actuators 170. Numerous commercially available microprocessors may be programmed to perform the functions of controller 180. It should be appreciated that controller 180 could readily embody a general microprocessor capable of controlling numerous control functions. Controller 180 may include all the components required to run an application such as, for example, a memory, a secondary storage device, and a processor, such as a central processing unit or any other means known. Various other known circuits may be associated with controller 180, including power source circuitry (not shown) and other appropriate circuitry.

Figure 4A:
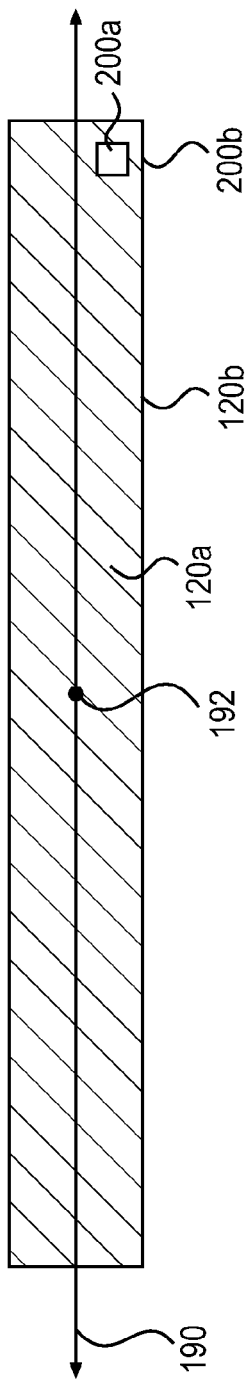
FIG. 4A is a view of two exemplary ramp portions that are aligned.
Figure 4B:
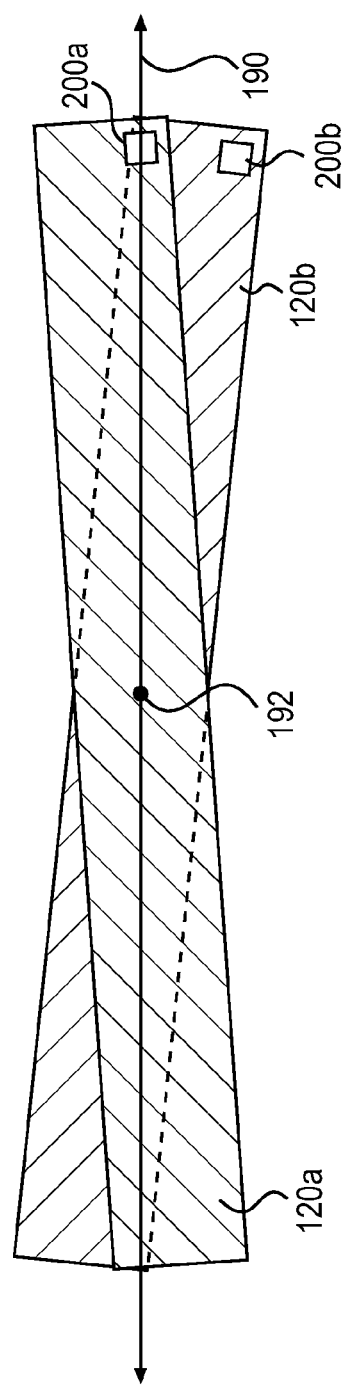
FIG. 4B is a view of two exemplary ramp portions that are misaligned.

FIGS. 4A and 4B illustrate two exemplary ramp portions 120a and 120b. FIG. 4A shows a cross-section of two aligned ramp portions 120a and 120b, and FIG. 4B illustrates two ramp portions 120a and 120b that are misaligned. When ramp portions 120a and 120b are aligned, a longitudinal axis 192, which may pass through the center of ramp 100 from bottom ramp portion 124 to top ramp portion 122, crosses through the center of the cross-sections of ramp portions 120a and 120b. As shown in FIGS. 4A and 4B, longitudinal axis 192 is illustrated as a dot at the center of the cross-section of ramp portion 120. A lateral axis 190, which intersects longitudinal axis 192 at a right angle, reaches from one outer edge of ramp portion 120 to the other outer edge of ramp portion 120. When ramp portions 120a-e are properly aligned, lateral axis 190 may be parallel to the upper surface of ramp portions 120a-e. FIG. 4B shows that when two ramp portions 120a and 120b are misaligned, lateral axis 190 is not parallel with at least one of ramp portions 120a and 120b.

As ramp 100 is designed to operate as an inclined surface, ramp 100 should not be completely level with respect to the longitudinal length of ramp 100. Rather, ramp 100 may have an inclined slope from bottom ramp portion 124 to top ramp portion 122. In terms of rotation axes, this inclined slope may be thought of in terms of rotation with respect to a lateral axis 190 of ramp 100. Lateral axis 190 may pass through ramp 100 across the top surface of ramp 100. A longitudinal axis 192, which may pass through the center of ramp 100 (so that it is equidistant from the two outer edges of each ramp portion 120a-e) from bottom ramp portion 124 to top ramp portion 122, is at a right angle with respect to lateral axis 190. A lateral slope may be thought of in terms of rotation with respect to longitudinal axis 192.

When the surface (e.g., ground or rail) on which ramp 100 is deployed is not level, it may cause a slight twisting, or rotation, in one or more of ramp portions 120a-e. Controller 180 may be configured to detect this longitudinal rotation. Ramp 100 may be considered longitudinally planar when the upper surfaces of ramp portions 120 are parallel to a latitude-longitude plane, which is the plane defined by both lateral axis 190 and longitudinal axis 192. Furthermore, a ramp 100 and/or ramp portion 120 may be considered longitudinally planar when a certain portion of the upper surface of ramp 100 and/or ramp portion 120 is within the latitude-longitude plane.

Alternatively or additionally, longitudinally planar ramps 100 and/or ramp portions 120 may encompass those ramps 100 and/or ramp portions 120 that have upper surfaces that are substantially parallel to the latitude-longitude plane. For example, in practical applications, it may not be desirable for the upper surface of every ramp portion 120 to lie within the latitude-longitude plane. As such, longitudinally planar may include those ramp portions 120 that have a certain percentage of their upper surface within the latitude-longitude plane. The tolerance of ramp 100 in certain applications to allow for deviations from the latitude-longitude plane may depend on the particular use of ramp 100. For example, ramp 100 may be considered level if at least about 90% of the top surface of ramp 100 is within the latitude-longitude plane.

Figure 5:
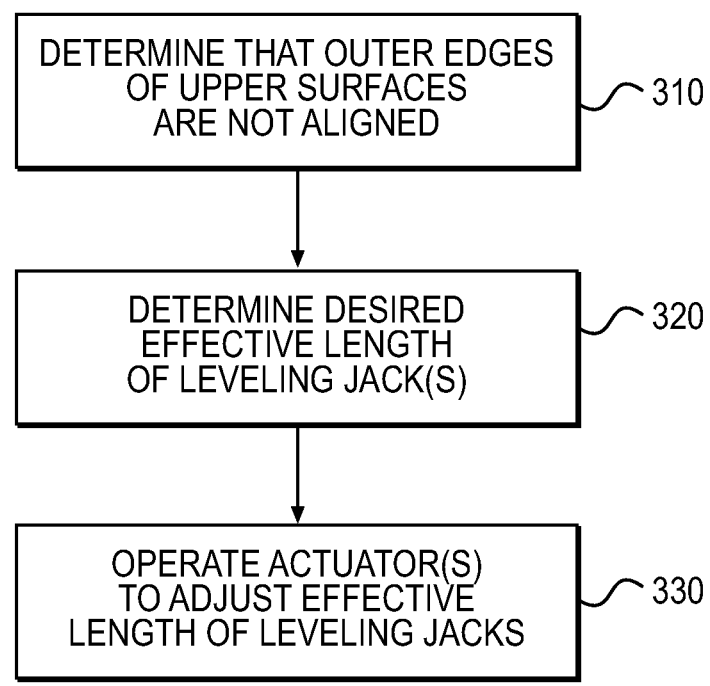
FIG. 5 is a flowchart depicting a method of leveling a ramp.

FIG. 5 is a flowchart depicting an exemplary embodiment of a method of leveling ramp portions 120a-e. At step 310, controller 180 may determine whether the outer edges of one of ramp portions 120a-e are aligned with the outer edges of an adjacent ramp portions 120a-e. As illustrated in FIGS. 4A and 4B, this is one exemplary method of determining whether adjacent ramp portions 120a-e are properly aligned. Leveling system 150 may include sensors to make this determination.

According to some embodiments, leveling system 150 may include a plurality of sensors 200 configured to determine whether at least one of ramp portions 120a-e is aligned with an adjacent ramp portion. For example, sensors 200 may provide signals indicative of a distance between the outer edges of the upper surfaces of two adjacent ramp portions 120a-e. If the distance is greater than a threshold tolerance, leveling system 150 may determine adjustments desirable to properly align ramp portions 120a-e. Additionally or alternatively, sensors 200 may be located at opposing edges of adjacent ramp portions 120. Sensors 200 may send signals indicative of whether the sensors located at opposing edges are aligned with one another. For example, one sensor 200 may be located on a surface of the outer edge of ramp portion 120a, and a second sensor 200 may be located on a surface of the outer edge of ramp portion 120b. When ramp portions 120a and 120b are properly aligned, the two sensors are oriented with respect to one another so that at least one sensor can provide a signal and at least the other sensor can receive the signal to indicate ramp portions 120a and 120b are aligned.

According to some embodiments, a plurality of sensors 200 may be configured to provide a sensor signal to controller 180 indicative of a longitudinal slope value for one or more of ramp portions 120. Sensors 200 may be arranged so to collect data from both sides of ramp portion 120, such as from both sides of longitudinal axis 192. For example, sensors 200 may include one or more gyroscopes and/or distance sensors configured to provide signals indicative of the distance between ramp portion 120 and the surface on which ramp 100 sits at different points along the length of ramp 100.

According to some embodiments, as shown in FIGS. 4A and 4B, sensors 200 may include pairs or arrays of sensors positioned on opposing sides of adjacent ramp portions 120a-e. These sensors 200 may be positioned such that when adjacent ramp portions 120a-e are properly aligned, at least one of the sensors 200 can receive a signal from another sensor 200 on the adjacent ramp portion 120a. For example, these sensors 200a and 200b shown in FIGS. 4A and 4B could include an infrared ("IR") receiver and an IR transmitter, such that the IR receiver can sense the signal sent by the IR transmitter when properly aligned. For example, sensor 200a may be an IR sensor that is always transmitting an IR signal, and sensor 200b could be a receiver that can receive the IR signal from sensor 200a only when the ramp portions 120a and 120b are aligned. Additionally or alternatively, sensors 200 may include one or more levels, configured to measure whether one or more ramp portions 120 and/or ramp 100 is longitudinally planar. Other types of sensors and sensor arrangements are contemplated.

For ramp 100 and/or ramp portion 120 to be level with respect to the longitudinal axis 192, the longitudinal slope of ramp 100 and/or ramp portion 120 would be zero. However, in practical applications, the longitudinal slope may be non-zero yet ramp 100 may be considered longitudinally planar. For example, depending on the maximum load ramp 100 is designed to handle, a longitudinal slope of zero may not be necessary for preventing sagging of ramp portions 120. Rather, ramp 100 may have a preferred range of longitudinal slopes. This preferred range may depend upon multiple factors such as, for example, the length of ramp 100, the maximum load ramp 100 may support, the lateral slope of ramp 100, and/or other physical characteristics of ramp 100.

The longitudinal slope of ramp 100 may be determined relative to a reference surface. The reference surface may be any surface, including an actual surface, such as, for example, the interface between ramp 100 and railcar 110. Additionally or alternatively, the reference surface may an imaginary surface, such as, for example, a horizontal plane or the latitude-longitude plane.

If at step 310, controller 180 determines that the outer edges of ramp portions 120a-e are not aligned, at step 320, controller 180 may determine the desired effective length of leveling jack 160 based on the longitudinal slope of ramp portion 120 and/or ramp 100. For example, controller 180 may determine the desired length based on sensor signals controller 180 receives from one or more of sensors 200. According to some embodiments, sensors 200 may each be associated with one or more leveling jacks 160. Based on the sensor signals, controller 180 may determine an adjustment to an associated leveling jack 160 and communicate a signal based on this sensor data to actuator 170 also associated with leveling jack 160. This signal affects movement of actuator 170 to cause alignment of ramp portions 120a-e.

Controller 180 may determine a desired length for one or more leveling jacks 160 to adjust the longitudinal slope so that it is within a preferred range of a desired slope relative to the reference surface based on the longitudinal slope of ramp 100 and/or ramp portion 120. Optionally, controller 180 may identify the current length of at least one leveling jack 160 associated with one or more of ramp portions 120a-e. According to some embodiments, controller 180 may receive a signal indicative of the length of leveling jack 160 from an associated actuator 170. Additionally or alternatively, controller 180 may contain a memory for storing the lengths of leveling jacks 160, and controller 180 may adjust the stored values consistent with the signals it sends to actuators 170 to adjust leveling jack length.

Controller 180 may also factor in the current length of leveling jack 160, which may be determined at the time the longitudinal slope is determined. For example, controller 180 may determine a percentage change of the leveling jack's effective length. To instruct actuator 170 to make this adjustment, controller 180 may determine the effective length of increase or decrease based on both the current length of leveling jack 160 and the longitudinal slope. Controller 180 may also determine an adjustment based on a relative location of leveling jack 160 on ramp 100.

At step 330, controller 180 may be configured to send a signal to one or more of actuators 170 to adjust the effective lengths of corresponding leveling jacks 160 in the event ramp 100 and/or one or more ramp portions 120a-e are not longitudinally planar. According to some embodiments, this signal may simply instruct actuator 170 to increase or decrease the effective length of leveling jack 160. According to some embodiments, the signal may instruct actuator 170 to increase or decrease the effective length of leveling jack 160 by a specified amount. For example, the signal may instruct actuator 170 to adjust leveling jack 160 to a desired length.

According to some embodiments, controller 180 may identify the length of at least one leveling jack 160 associated with a ramp portion 120. According to some embodiments, controller 180 may receive a signal indicative of the length of leveling jack 160 from associated actuator 170. Additionally or alternatively, controller 180 may include a memory for storing the lengths of leveling jacks 160, and controller 180 may adjust the stored values consistent with the signals it sends to actuators 170 to adjust leveling jack length.

INDUSTRIAL APPLICABILITY

The disclosed systems and methods may provide a robust solution for leveling a ramp. As a result, these systems and methods may decrease the wear on the ramp caused by uneven parts of the rail. The presently disclosed leveling system may have several advantages. First, it may provide a solution to leveling a surface by decreasing the surface's rotation with respect to one axis regardless of its degree of rotation around another axis. This is particularly useful in ramp applications in which the ramp has a slope with respect to the longitudinal axis, but it is undesirable for the ramp to have a lateral slope.

For ramps with a particularly long length, even if the rotation of the whole ramp may be negligible, some portions may have higher degrees of rotations that will cause the premature breakdown of the ramp. For example, while a ramp may appear level with respect to surface, portions of the ramp may be subject to undesirable twisting as a result of, for example, the uneven surface on which the ramp is situated. With a plurality of sensors and leveling jacks that can be installed at different areas along the ramp, the disclosed leveling system may provide a solution to detect and improve any undesirable twisting along the ramp, which may reduce wear on the ramp.

It will be apparent to those skilled in the art that various modifications and variations can be made to the loading ramp and associated methods for operating the same. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method of leveling a ramp having a first and second portion, the method comprising:
   determining that outer edges of the first ramp portion are not aligned with outer edges of the second ramp portion;
   determining a desired effective length of at least one leveling jack associated with the first ramp portion based on the determination; and
   operating an actuator associated with the at least one leveling jack to achieve the desired effective length of the at least one leveling jack,
   wherein determining that the outer edges of the first ramp portion are not aligned with the outer edges of the second ramp portion further includes receiving signals from at least two sensors, each sensor located at opposing edges of the first and second ramp portions, and wherein the signals are indicative of whether the sensors are aligned with one another.

2. A method of leveling a ramp having a first and second portion, the method comprising:
   determining that outer edges of the first ramp portion are not aligned with outer edges of the second ramp portion;
   determining a desired effective length of at least one leveling jack associated with the first ramp portion based on the determination; and
   operating an actuator associated with the at least one leveling jack to achieve the desired effective length of the at least one leveling jack,
   wherein determining that the outer edges of the first ramp portion are not aligned with the outer edges of the second ramp portion further includes receiving signals from at least two sensors, the signals being indicative of a distance between the outer edges of the upper surfaces of the first and second ramp portions.

3. The method of claim 2, further including determining the longitudinal slope of the first ramp portion based on the sensor signals indicative of the distance between the outer edges of the upper surfaces of the first and second ramp portions.

4. The method of claim 3, wherein determining the desired effective length further includes determining an adjustment the longitudinal slope to within a predefined range of a desired slope relative to a reference surface.

5. The method of claim 4, wherein the reference surface is defined by an interface between the ramp and a railcar to which the ramp is mounted.

* * * * *